(12) United States Patent
Rossetti et al.

(10) Patent No.: US 8,121,474 B2
(45) Date of Patent: Feb. 21, 2012

(54) STANDBY BROADBAND LIGHT SOURCE FOR PASSIVE OPTICAL NETWORKS

(75) Inventors: Damiano Rossetti, Monza (IT); Wolfgang Fischer, Germering (DE)

(73) Assignee: CISCO TECHNOLOGY, Inc., San Jose, CA (US)

(*) Notice: Subject to any disclaimer, the term of this patent is extended or adjusted under 35 U.S.C. 154(b) by 583 days.

(21) Appl. No.: 12/330,325

(22) Filed: Dec. 8, 2008

(65) Prior Publication Data

US 2010/0142954 A1 Jun. 10, 2010

(51) Int. Cl.
*H04J 14/02* (2006.01)
*H04B 10/04* (2006.01)

(52) U.S. Cl. .................................. 398/2; 398/7

(58) Field of Classification Search .............. 398/1–7, 398/137
See application file for complete search history.

(56) References Cited

U.S. PATENT DOCUMENTS

| | | | | |
|---|---|---|---|---|
| 6,351,582 | B1* | 2/2002 | Dyke et al. | 385/24 |
| 7,551,850 | B2* | 6/2009 | Alana et al. | 398/2 |
| 2005/0163503 | A1* | 7/2005 | Lee et al. | 398/19 |
| 2009/0245799 | A1* | 10/2009 | Habel et al. | 398/79 |

* cited by examiner

*Primary Examiner* — Leslie Pascal
(74) *Attorney, Agent, or Firm* — Patterson & Sheridan LLP

(57) ABSTRACT

Techniques are disclosed for a broadband service provider to maintain continuity of service in the event that a broadband light source fails in a passive optical network which uses injection-locked transmitters. Generally, a first broadband light source is connected to a passive optical network. Should the first broadband light source fails, it is disconnected from the network, and a second broadband light source is connected to the network.

21 Claims, 6 Drawing Sheets

SINGLE STANDBY BLS TO PROTECT MULTIPLE BLS'S

SINGLE STANDBY BLS TO PROTECT MULTIPLE BLS'S

US 8,121,474 B2

STANDBY BROADBAND LIGHT SOURCE FOR PASSIVE OPTICAL NETWORKS

TECHNICAL FIELD

Embodiments described in this disclosure relate to managing signal transmission for a passive optical network using injection-locked transmitters. More specifically, embodiments provide a standby broadband light source for passive optical networks.

BACKGROUND

Next generation broadband internet access networks are based on fiber to the home (FTTH) architectures, which overcome the bandwidth limitations of copper-based transmission technologies. Most FTTH deployments either use dedicated fibers for each customer in a star topology, or passive optical networks (PON), which use a tree-shaped topology with a single feeder fiber trunk, optical splitters, and dedicated drop fibers as branches of the tree. For a PON, subscriber access to the endpoints of the shared medium is controlled by a TDMA-based mechanism.

The tree-shaped topology of PONs has disadvantages in terms of shared bandwidth, security and upgradability. Star topologies require significantly more fibers to be terminated at a central office. An alternative to the above methods is to deploy a dense wavelength division multiplexing (DWDM) PON. A DWDM PON uses per-subscriber wavelengths to share a feeder fiber and employs arrayed waveguide grating (AWG) to route individual wavelengths to individual endpoints on both the subscriber-side and central office-side. Thus, a DWDM PON combines the best of both worlds: scalability, upgradability and security of star architectures, and the fiber sharing of tree architectures.

For a DWDM PON application, one challenge is to provide a wavelength division multiplexing (WDM) transmitter for each end user to allow upstream communication from a subscriber to the central office. An efficient way to accomplish this is to use spectral slicing with an injection locked Fabry-Perot (FP) laser or an injection locked reflective semiconductor optical amplifier (RSOA). In this architecture, a broadband light source (BLS), a laser array, or similar structure is used to seed a Fabry-Perot laser or RSOA in each optical network unit (ONU). The BLS spectrum propagating toward the subscriber's remote node is sliced by an AWG in the remote node. The sliced continuous wave seed light is used to "injection lock" the FP/RSOA laser transmitter within the subscriber's ONU. The same approach is used for the downstream signal: at the OLT/central office, the FP/RSOA transmitter is injection-locked by a BLS propagating towards the central office. Thus, the upstream/downstream signal depends on the operability of the seeding source (i.e., the BLS).

Overview

Embodiments described in this disclosure provide techniques for allowing a broadband service provider to maintain continuity of service in the event that a broadband light source fails in a passive optical network which uses injection-locked transmitters.

One embodiment includes a system configured to maintain continuity of service to a passive optical network (PON). The system may generally include an active broadband light source (BLS) providing service to a dense wavelength division multiplexing (DWDM) PON, a standby broadband light source; and a monitoring device. The monitoring device may be configured to detect a failure of the active BLS providing service to the DWDM PON, disconnect the active broadband light source from the DWDM PON, and connect the standby broadband light source to the DWDM PON. Once connected, the standby broadband light source provides service to the DWDM PON. In a particular embodiment, the system includes a plurality of active broadband light source (BLSs) each providing service to a respective DWDM PON. In such a case, the standby BLS may be connected to any one of the respective DWDM PONs upon detecting a failure of a given active BLS.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Figure 1:
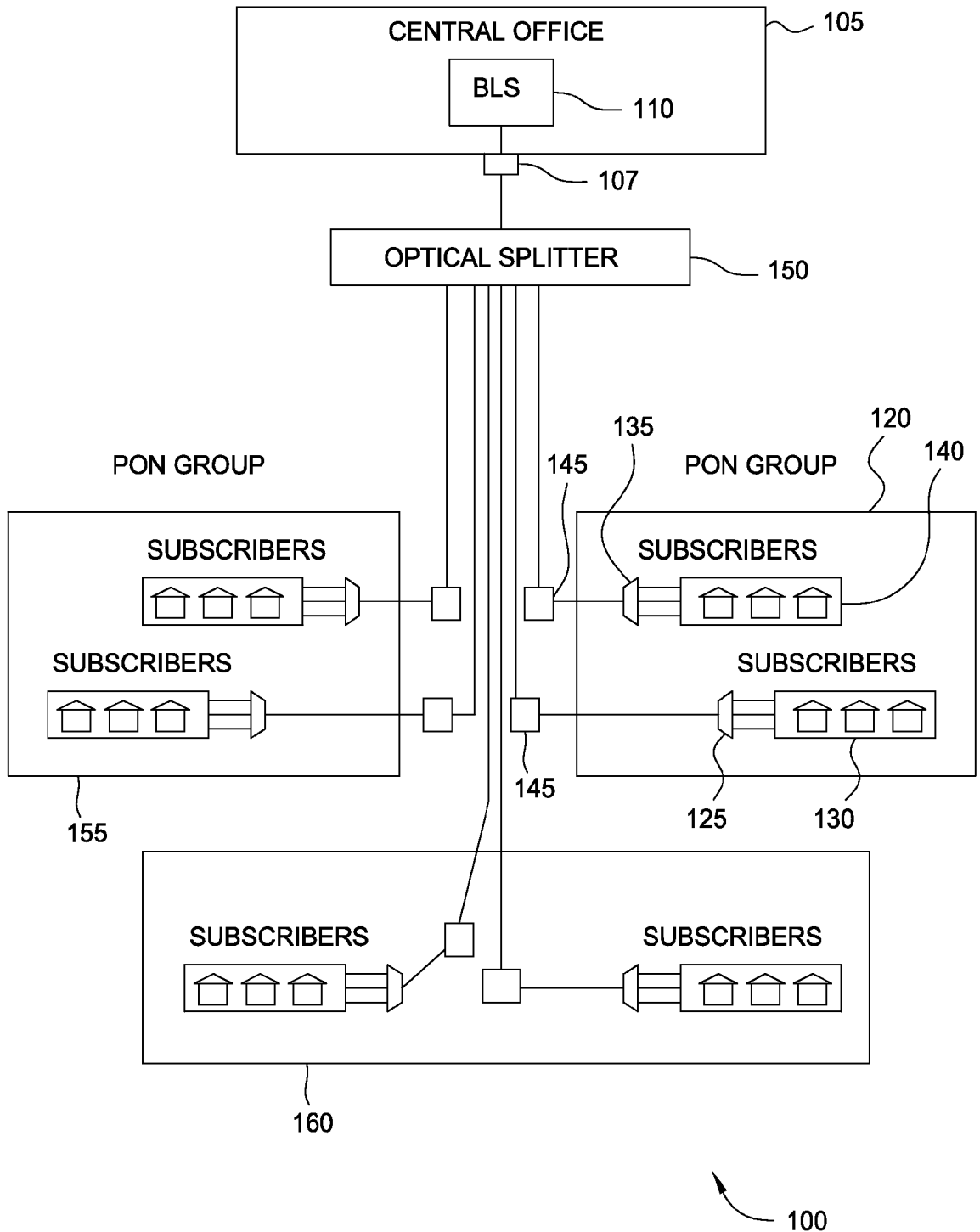
FIG. 1 is a block diagram illustrating a central office and a WDM PON for providing broadband access to subscribers, according to one embodiment.

Embodiments described in this disclosure provide techniques allowing a broadband service provider to maintain continuity of service in the event that a broadband light source fails in a passive optical network which uses injection-locked transmitters. For a wavelength division multiplexing passive optical network (WDM PON) based on Fabry-Perot (FP) or reflective semiconductor optical amplifier (RSOA) transmitters, the upstream/downstream signal is strictly dependent on a seeding source. Thus, if a broadband light source (BLS) is used as the seeding source, it should remain active for subscribers to enjoy continuous broadband service. Note, for simplicity, a broadband light source "BLS" is generally used in this disclosure to refer to a seeding light source for a WDM PON; however, other structures that meet the requirements of a WDM PON architecture may be used, e.g., a laser array with a range of dedicated wavelengths. If the BLS fails, then the entire network that depends upon the BLS fails as well. Thus, a BLS failure may disrupt service to a large number of subscribers until the BLS is either repaired or replaced. To remain competitive and retain customers, broadband service providers may wish to minimize or eliminate the disruption of service caused when a BLS fails.

Generally, in one embodiment, a first broadband light source is connected to a passive optical network. Should the first broadband light source fail, it is disconnected from the network, and a second broadband light source is connected to the network. The second broadband light source may be changed from a standby mode to an active mode. At the same time, the first broadband light source may be changed to a standby mode and serviced as necessary. The standby mode may require less power than active mode. The first broadband light source and the second broadband light source may be shared among multiple networks. Further, one standby broadband light source may be shared among multiple broadband light sources. Further still, in one embodiment, two (or more) BLSs may each be partially powered (and providing service to a PON), and should one of the BLSs, fail the other may increase power to provide service for PON covered by the failed BLS.

This disclosure references various embodiments. However, it should be understood that this disclosure is not limited to embodiments described herein. Instead, any combination of the following features and elements, whether related to different embodiments or not, is contemplated to implement and practice an embodiment. Furthermore, in various embodiments, embodiments provide numerous advantages over the prior art. However, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s).

FIG. 1 is a block diagram 100 illustrating a central office 105 and a PON groups 120, 155, and 160 for providing broadband access to subscribers 130, according to one embodiment. As shown, the central office 105 includes at least a BLS 110 that transmits light to PON groups 120, 155, and 160 through an optical splitter 150 and optical circulators 145. Illustratively, each PON is fed by a separate optical circulator 145 which in turn, is fed by an individual output from the splitter 150. For example, the PON group 120 has wavelength filters 125, 135 that use dense wavelength division multiplexing to route wavelengths to subscribers 130, 140. PON groups 155 and 160 include similar elements.

Additionally, each subscriber 130 has a WDM transmitter to communicate upstream to the central office 105. In one embodiment, the WDM transmitter uses an FP laser that is injection locked by seed light that has been sliced by the wavelength filters. Similarly, an FP laser 107 at the central office 105 may be injection locked by light propagating towards the central office 105. In another embodiment, an RSOA may be used instead of an FP laser. In yet another embodiment, an array of distributed feedback lasers may be used to seed the FP laser or RSOA. One of ordinary skill in the art will recognize that other methods may be used to create a seeding source of light.

Figure 2:
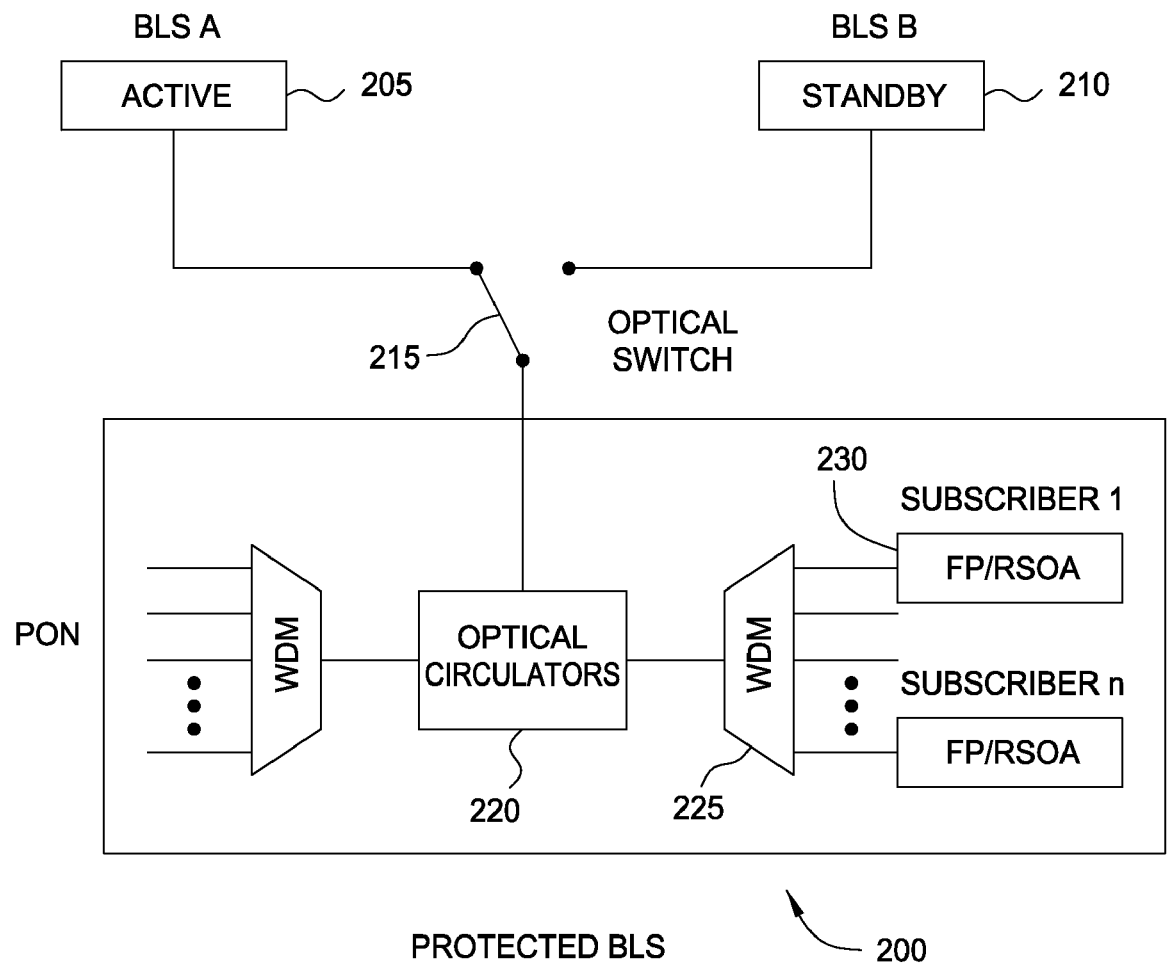
FIG. 2 is a diagram illustrating an active BLS connected to a WDM PON, an optical switch, and a standby BLS, according to one embodiment.

FIG. 2 is a diagram 200 illustrating an active BLS A 205 connected to a WDM PON, an optical switch 215, and a standby BLS B 210, according to one embodiment. As shown, BLS A 205 is connected to a PON through an optical switch 215. As is known, an optical splitter may be used to add a BLS to a PON. Alternatively, a more complex optical structure based on two circulators and two WDM filters may be used to add a BLS to a PON. This latter option is currently used more frequently. In any case, the example shown in FIG. 2 includes an optical switch 215 as well as an optical circulator (and/or splitters) 220, a WDM filter 225, and subscribers that have an FP or RSOA transmitter 230. BLS B 210 is also connected to the optical switch 215. Illustratively, BLS B 210 is in a standby mode. If BLS A 205 fails, BLS B 210 switches to an active mode and connects to the PON, while BLS A disconnects from the PON. For example, a photodiode may realize the occurrence of a failure in the active BLS and raise an alarm. In response, a DSP managing BLS A 205 and BLS B 215 can send a signal to trigger the optical switch 215. This process is described in greater detail below for FIGS. 3A-3B. In one embodiment, BLS B 210 is fully powered while in standby mode, allowing the BLS B 210 to quickly replace the failed BLS A 205. In another embodiment, BLS B 210 is partially powered while in standby mode. In yet another embodiment, BLS B 210 is not powered while in standby mode. Although energy is saved by providing partial or no power to BLS B 210 while in standby mode, it may take longer for BLS B 210 to replace the failed BLS A 205, since it takes time to power up.

Figure 3:
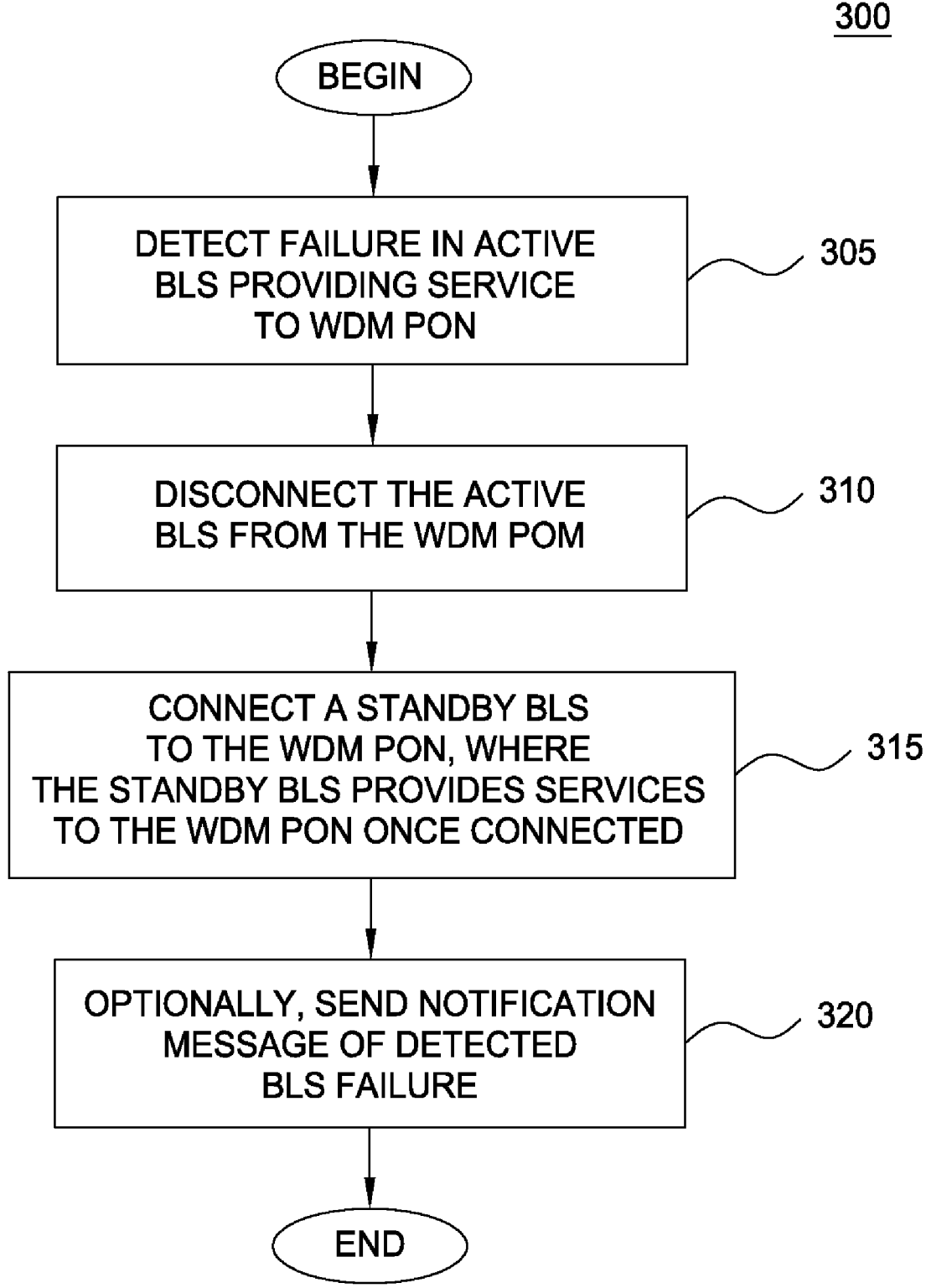
FIG. 3 is a flow diagram illustrating a method for switching to a standby BLS in response to a detected failure in an active BLS providing service to a WDM PON, according to one embodiment.

FIG. 3 is a flow diagram illustrating a method 300 for switching to a standby BLS provided for a PON in response to detecting a failure in an active BLS providing service to the PON, according to one embodiment. As shown, the method 300 begins at step 305, where a failure occurs in an active BLS, and the failure is detected by a monitoring device. For example, a photodiode device may be configured to monitor the optical signal supplied by the active BLS to the PON. At step 310, the active BLS is disconnected from the PON, and at step 315, the standby BLS is connected to the PON. For example, an optical switch may be configured to receive a signal from the monitoring device, and, in response, switch a connection between the active BLS and the PON to a connection between the standby BLS and the PON. Further, in one embodiment, the process of disconnecting the active BLS and connecting the standby BLS may include modifying the power level of each of the BLSS. That is, the power supply to the active BLS may be reduced and the power supplied to the standby BLS may be increased.

At step 320, the monitoring device may optionally take additional action in response to detecting the failure in the active BLS. For example, the monitoring device may send a notification of the detected failure to a designated party. In one embodiment, e.g., the notification may take the form of an automatic message sent to a computer system (e.g., an email message or an instant message sent to a designated system administrator). Of course, other methods may be used to indicate a BLS failure, including flashing lights, auditory alarms, etc.

Figure 4A:
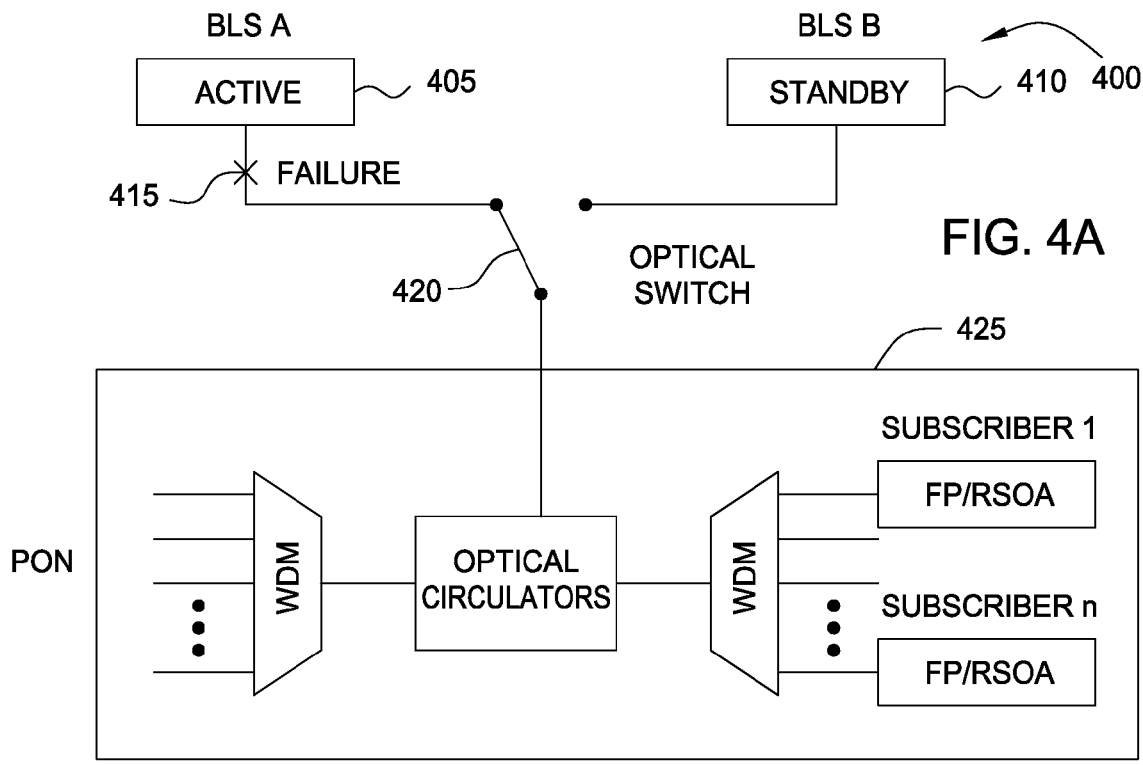
FIGS. 4A and 4B illustrate a switch from an active BLS to a standby BLS in response to a detected failure, according to one embodiment.
Figure 4B:
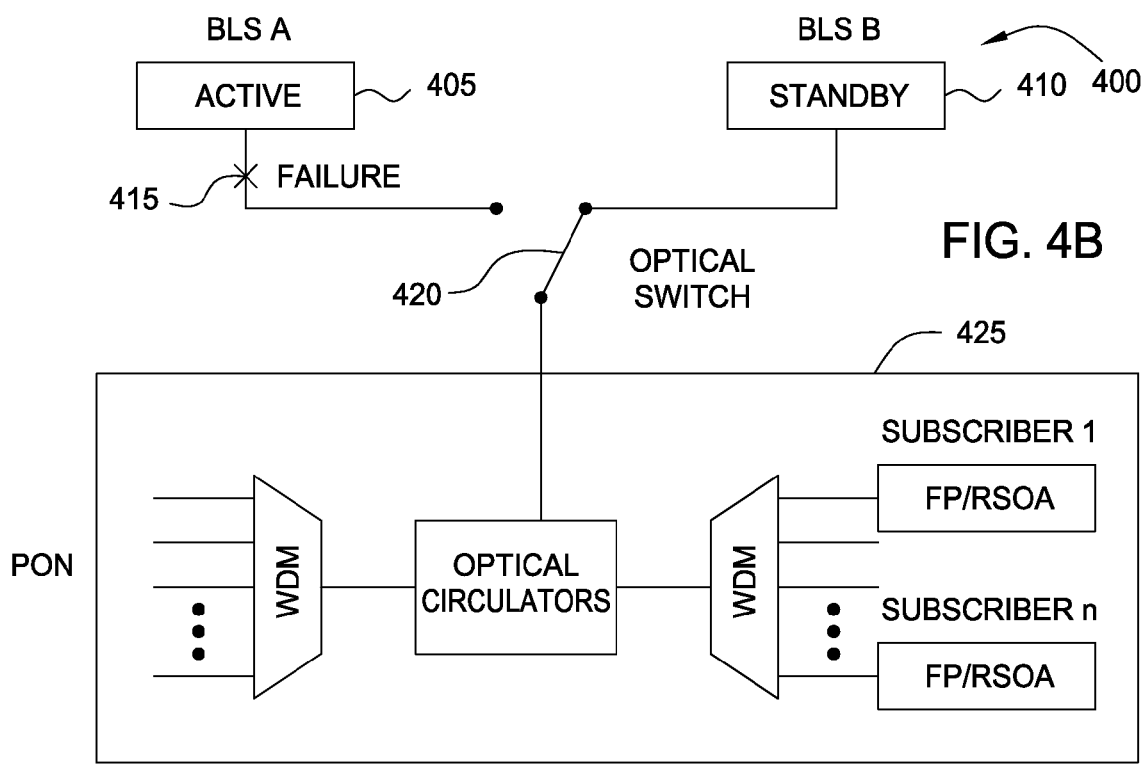

FIGS. 4A and 4B illustrate a switch from an active BLS to a standby BLS in response to a detected failure, according to one embodiment. First, FIG. 4A is a diagram 400 illustrating an optical switch 420 and a standby BLS B 410. As shown, the active BLS A 305 is connected to a WDM PON 425. Further, in this example, the connection between the active BLS A 405 and the WDM PON 425 has failed, as indicated by the X at point of failure 415. One of ordinary skill in the art will recognize that the failure may occur within BLS A 405 directly or along a connection between BLS A 405 and the optical switch 420. In one embodiment, the optical switch 420 may be configured to detect either type failure (e.g., using a photodiode device).

FIG. 4B is a diagram 460 illustrating a now active BLS B 470 connected to a PON. Active BLS B 470 corresponds to the standby BLS 410 of FIG. 4A, prior to the detection of the failure. Similarly, standby BLS A 465 corresponds to active BLS 405 of FIG. 4A, prior to the detection of the failure. As shown, the optical switch 420 has disconnected the (formerly) active and now standby BLS A 365 from the PON. Also as shown, (formerly standby) and now active BLS B 470 is connected to the PON 425 through the optical switch 420. That is, BLS B 470 is in active mode and is fully powered, providing a broadband light source for the PON 425. Once BLS B 470 is connected to the PON 425 (and BLS A 465 is disconnected), BLS A 465 (or the connection from BLS A 465 to the optical switch 420) may be repaired or replaced, as necessary.

Figure 5:
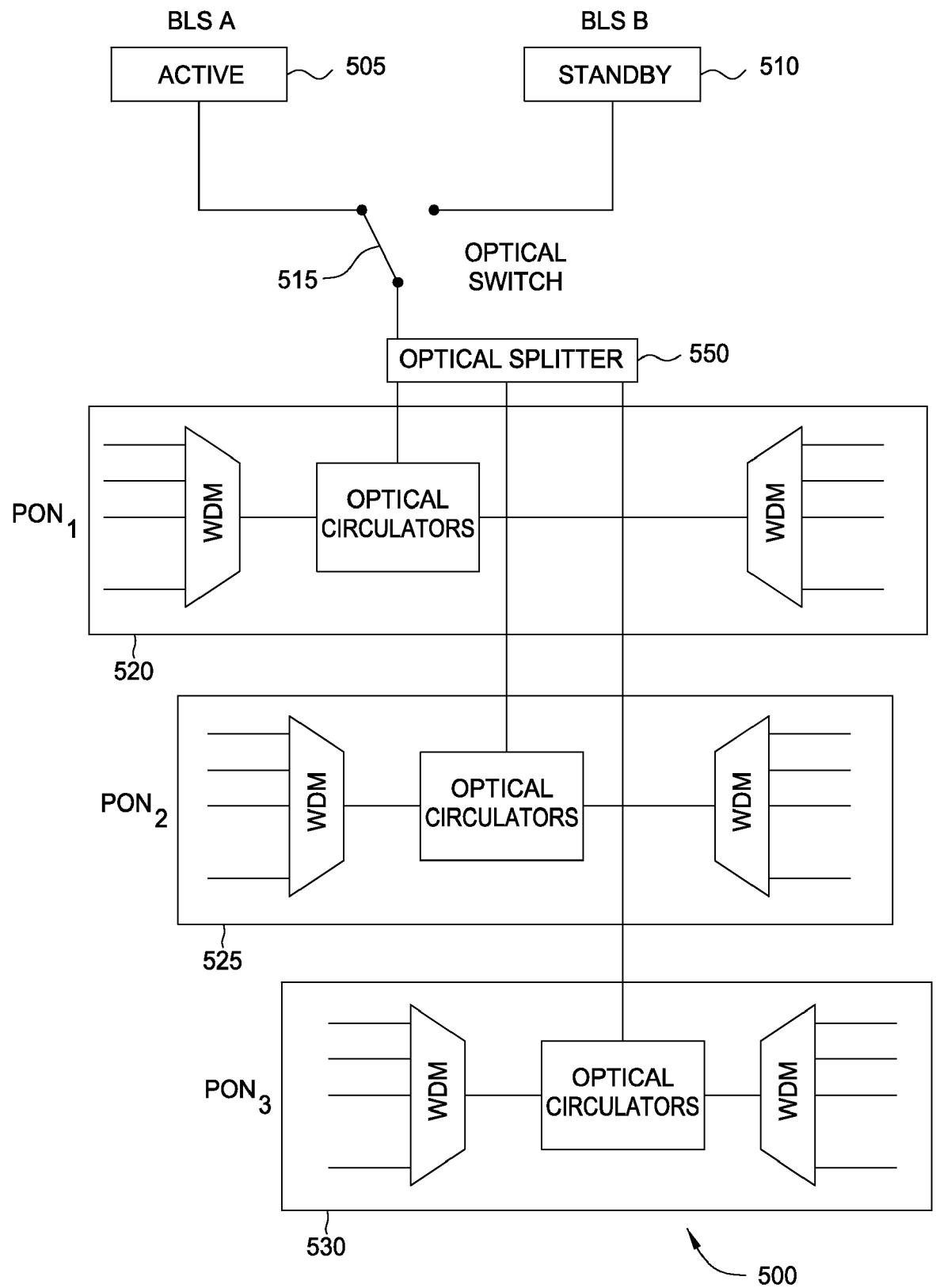
FIG. 5 is a diagram illustrating an active BLS connected to multiple WDM PONs, according to one embodiment.

In addition to providing a standby BLS for a single WDM PON, embodiments may be adapted to provide a standby BLS for multiple WDM PONs. For example, FIG. 5 is a diagram 500 illustrating an active BLS A 405 connected to WDM PONs 520, 525, and 530, an optical switch 515, an optical splitter 550, and a standby BLS B 510, according to one embodiment. Efficiency gains may be realized by sharing one BLS between multiple PONs. Specifically, BLS A 505 is connected to a first PON 520, a second PON 525, and a third PON 530 through an optical switch 515, an optical splitter 550, and optical circulators. In the event that BLS A 505 fails, the optical switch 515 disconnects BLS A 505 from the networks and connects BLS B 510 to the networks. BLS B 510 changes to an active state and is powered on, if necessary. Thus, in the example of FIG. 5, BLS B 510 provides a standby BLS for more than one PON.

Figure 6:
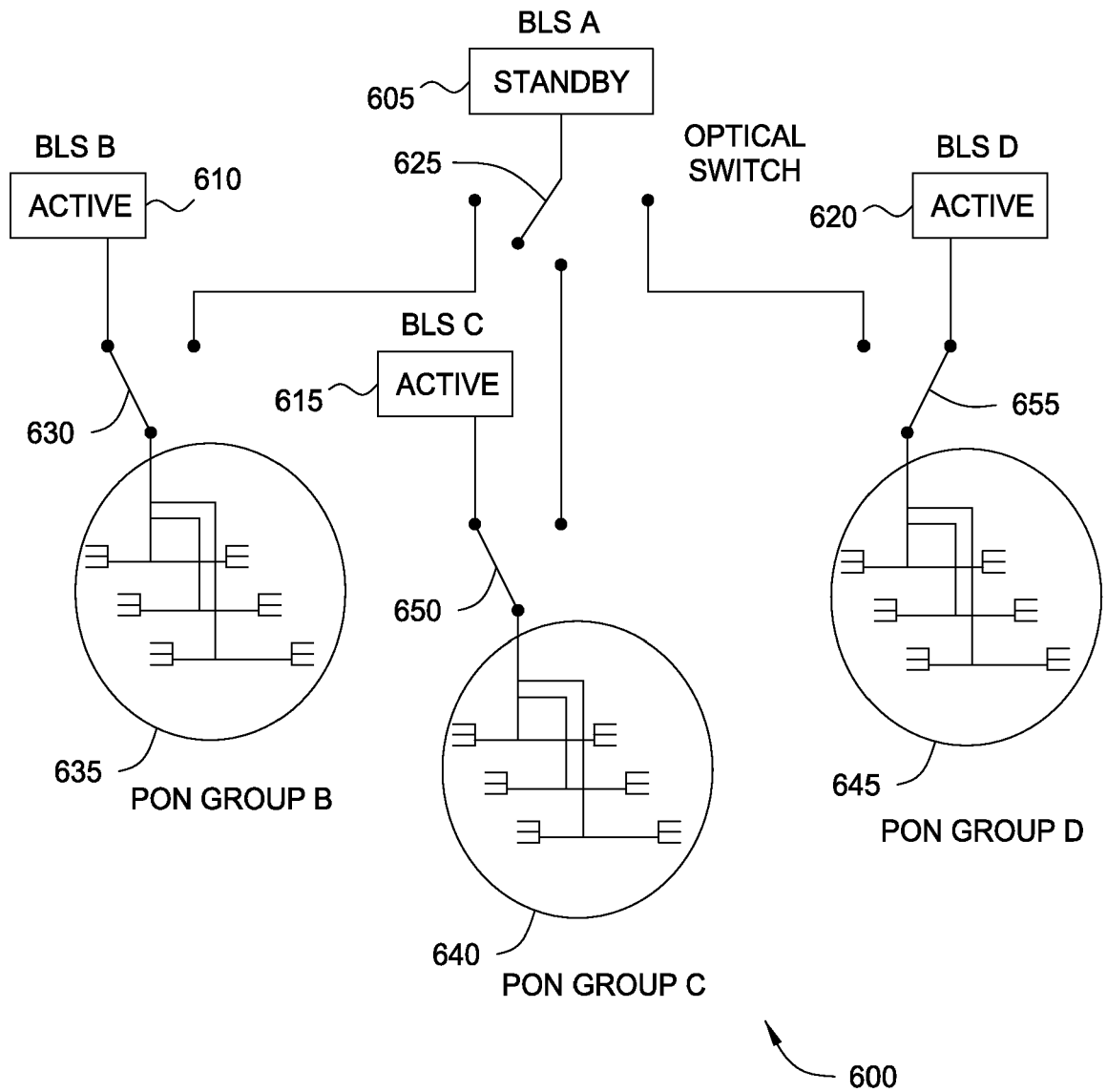
FIG. 6 is a diagram illustrating a standby BLS providing a backup for multiple BLSs, according to one embodiment.

Similarly, FIG. 6 is a diagram 600 illustrating a standby BLS A 605 providing a backup for multiple BLSs, according to one embodiment. As shown, BLS A 605 is connected to a first optical switch 625. The first optical switch 625 is also connected to an optical switch 630 for PON Group B 635, a second optical switch 650 for PON Group C 640, and a third optical switch 655 for PON Group D 645. In this example, each PON group 635 640 645 is connected to a separate BLS through one of the optical switches 630, 650, and 655. For example, BLS B 610 is connected to PON Group B 535 through the optical switch 630. If BLS B 610 fails (or the connection between BLS B 610 and PON Group B fails 635), the optical switch 625 and/or the optical switch 630 may detect the failure PON Group B 635. In response to detecting the failure, the standby BLS A 605 may be connected to PON Group B 635 by optical switch 625 and optical switch 630. That is, BLS A 505 changes to an active status and may be powered up, if necessary. BLS A 505 may have no power, partial power, or full power while in standby mode, depending, e.g., on the desired power consumption and time to power up. Thus, in this example, BLS A 505 serves as a standby BLS for more than one active BLS. By allowing one backup BLS to serve multiple active BLS's, fewer backup BLSs are needed. Thus, cost may be reduced and additional power may be saved.

Advantageously, as described above, embodiments described above provide techniques allowing a broadband service provider to maintain continuity of service in the event that a broadband light source fails in a passive optical network which uses injection-locked transmitters. Generally, a first broadband light source is connected to a passive optical network. Should the first broadband light source fail, it is disconnected from the network, and a second broadband light source is connected to the network. The second broadband light source may be changed from standby mode into active mode. The first broadband light source may be changed to standby mode. Standby mode may require less power than active mode. The first broadband light source and the second broadband light source may be shared among multiple networks. One standby broadband light source may be shared among multiple broadband light sources.

While the foregoing is directed to embodiments of the present disclosure, other and further embodiments of the disclosure may be devised without departing from the basic scope thereof, and the scope thereof is determined by the claims that follow.

The invention claimed is:

1. A system configured to maintain continuity of service to a plurality of dense wavelength division multiplexing (DWDM) passive optical networks (PONs), the system comprising:
    a plurality of active broadband light sources (BLSs), each providing service to a respective one or more DWDM PONs of the plurality of DWDM PONs;
    a standby BLS available to provide continuity of service for each of the plurality of DWDM PONs; and
    a monitoring device, wherein the monitoring device is configured to:
        detect a failure of one of the plurality of active BLSs providing service to at least one DWDM PON of the respective one or more DWDM PONs,
        disconnect the failed BLS from the at least one DWDM PON, and
        connect the standby BLS to the at least one DWDM PON, wherein the standby BLS provides service to the at least one DWDM PON once connected.

2. The system of claim 1, wherein disconnecting the active BLS from the DWDM PON comprises reducing power supplied to the active BLS.

3. The system of claim 2, wherein connecting the standby BLS to the DWDM PON comprises increasing power supplied to the standby BLS.

4. The system of claim 1, wherein the standby BLS is in a partially powered state when the failure is detected, and wherein connecting the standby BLS to the DWDM PON comprises transitioning the standby BLS to a fully powered state.

5. The system of claim 1, wherein the active BLS and the standby BLS are shared among two or more DWDM PONs.

6. The system of claim 1, wherein the monitoring device includes a photodiode configured to detect the failure of the active BLS and an optical switching device configured to disconnect the active BLS and connect the standby BLS upon detecting the failure.

7. The system of claim 1, wherein the DWDM PON includes one or more injection locked transmitters with Fabry-Perot lasers.

8. The system of claim 1, wherein the DWDM PON includes one or more injection locked transmitters with reflective semiconductor optical amplifiers.

9. The system of claim 1, wherein the active BLS and the standby BLS each provide a laser array with a specified range of dedicated wavelengths.

10. A method for maintaining continuity of service to a plurality of dense wavelength division multiplexing (DWDM) passive optical networks (PONs), the method comprising:
    configuring a plurality of active broadband light sources (BLSs) to each provide service to a respective one or more DWDM PONs of the plurality of DWDM PONs;
    configuring a standby BLS to provide continuity of service for each of the plurality of DWDM PONs;
    detecting a failure of an active BLS providing service to at least one DWDM PON of the respective one or more DWDM PONs;
    disconnecting the failed BLS from the at least one DWDM PON; and
    connecting the standby BLS to the at least one DWDM PON, wherein the standby BLS provides service to the at least one DWDM PON once connected.

11. the method of claim 10, wherein disconnecting the active BLS from the DWDM PON comprises reducing power supplied to the active BLS.

12. The method of claim 11, wherein connecting the standby BLS to the DWDM PON comprises increasing power supplied to the standby BLS.

13. The method of claim 10, wherein the standby BLS is in a partially powered state when the failure is detected, and wherein connecting the standby BLS to the DWDM PON comprises transitioning the standby BLS to a fully powered state.

14. The method of claim 10, wherein the active BLS and the standby BLS are shared among two or more DWDM passive optical networks (PONs).

15. The method of claim 10, wherein a photodiode is configured to detect the failure of the active BLS and an optical switching device is configured to disconnect the active BLS and connect the standby BLS upon detecting the failure.

16. The method of claim 10, wherein the DWDM PON includes one or more injection locked transmitters with Fabry-Perot lasers.

17. The method of claim 10, wherein the DWDM PON includes one or more injection locked transmitters with reflective semiconductor optical amplifiers.

18. A computer-readable storage-medium containing a program which, when executed, performs an operation to maintain continuity of service to a plurality of dense wavelength division multiplexing (DWDM) passive optical networks (PONs), the operation comprising:

configuring a plurality of active broadband light sources (BLSs) to each provide service to a respective one or more DWDM PONs of the plurality of DWDM PONs;

configuring a standby BLS to provide continuity of service for each of the plurality of DWDM PONs;

detecting a failure of an active BLS providing service to at least one DWDM PON of the respective one or more DWDM PONs;

disconnecting the failed BLS from the at least one DWDM PON; and connecting the standby BLS to the at least one DWDM PON, wherein the standby BLS provides service to the at least one DWDM PON once connected.

19. The computer-readable storage-medium of claim 18, wherein disconnecting the active BLS from the DWDM PON comprises reducing power supplied to the active BLS, and wherein connecting the standby BLS to the DWDM PON comprises increasing power supplied to the standby BLS.

20. The computer-readable storage-medium of claim 18, wherein the standby BLS is in a partially powered state when the failure is detected, and wherein connecting the standby BLS to the DWDM PON comprises transitioning the standby BLS to a fully powered state.

21. The computer-readable storage-medium of claim 18, wherein the active BLS and the standby BLS are shared among two or more DWDM passive optical networks (PONs).

* * * * *

UNITED STATES PATENT AND TRADEMARK OFFICE
CERTIFICATE OF CORRECTION

PATENT NO. : 8,121,474 B2  
APPLICATION NO. : 12/330325  
DATED : February 21, 2012  
INVENTOR(S) : Rossetti et al.

Page 1 of 1

It is certified that error appears in the above-identified patent and that said Letters Patent is hereby corrected as shown below:

In Description of Example Embodiments:

Column 4, Line 32, please delete "BLSS" and insert --BLSs-- therefor.

Signed and Sealed this  
Twenty-ninth Day of May, 2012

David J. Kappos  
*Director of the United States Patent and Trademark Office*